US011656368B2

(12) United States Patent
Block et al.

(10) Patent No.: US 11,656,368 B2
(45) Date of Patent: May 23, 2023

(54) SYSTEMS AND METHODS FOR GPS/GNSS BASED REAL TIME GLOBAL ASSET TRACKING

(71) Applicant: The Board of Trustees of the Leland Stanford Junior University, Stanford, CA (US)

(72) Inventors: Barbara Ann Block, Pacific Grove, CA (US); Sherman C. Lo, Stanford, CA (US); David S. De Lorenzo, Stanford, CA (US); Yu-Hsuan Chen, Stanford, CA (US); Per K. Enge, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 54 days.

(21) Appl. No.: 17/340,580

(22) Filed: Jun. 7, 2021

(65) Prior Publication Data

US 2021/0382182 A1    Dec. 9, 2021

Related U.S. Application Data

(60) Provisional application No. 63/035,555, filed on Jun. 5, 2020.

(51) Int. Cl.
| G01S 19/42 | (2010.01) |
| G01S 19/34 | (2010.01) |
| G01S 19/45 | (2010.01) |
| H01Q 1/24  | (2006.01) |
| H04L 67/52 | (2022.01) |

(52) U.S. Cl.
CPC .............. *G01S 19/42* (2013.01); *G01S 19/34* (2013.01); *G01S 19/45* (2013.01); *H01Q 1/24* (2013.01); *H04L 67/52* (2022.05)

(58) Field of Classification Search
CPC .......... G01S 19/42; G01S 19/34; G01S 19/45; H04L 67/52; H01Q 1/24
USPC ..................................................... 342/357.25
See application file for complete search history.

(56) References Cited

U.S. PATENT DOCUMENTS

| 2015/0123847 | A1* | 5/2015  | Farmer    | G01S 19/34   |
|              |     |         |           | 342/357.74   |
| 2018/0329023 | A1* | 11/2018 | Perez-Cruz | G01S 5/0278 |
| 2019/0349853 | A1* | 11/2019 | Singh     | G01S 19/25   |
| 2021/0382182 | A1* | 12/2021 | Block     | G01S 19/09   |

* cited by examiner

*Primary Examiner* — Harry K Liu
(74) *Attorney, Agent, or Firm* — KPPB LLP

(57) ABSTRACT

Systems and methods for global positioning satellite (GPS)/global navigation satellite system (GNSS) based real time global asset tracking are described. In an embodiment provides a system for real time, fast, global asset tracking, the system includes: a server with a processor, a memory, and a network interface, wherein the memory includes a tracking application, where the tracking application directs the processor to: receive a message including specific data from a tag; determine a time search window based on the message received from the tag; perform an initial position search; perform calculations for position and time, utilizing the time search window, the initial position search and satellite ephemeris information; and display a position information of the tag.

7 Claims, 19 Drawing Sheets

SYSTEMS AND METHODS FOR GPS/GNSS BASED REAL TIME GLOBAL ASSET TRACKING

RELATED APPLICATIONS

This application claims priority to U.S. patent application Ser. No. 63/035,555 entitled "Systems and Methods for GPS/GNSS Based Real Time Global Asset Tracking" to Block et al., filed Jun. 5, 2020, the disclosure of which is incorporated herein by reference in its entirety.

FIELD OF THE INVENTION

The present invention generally relates to location tracking, and more specifically, to systems and methods for global positioning satellite (GPS)/global navigation satellite system (GNSS) based real time global asset tracking.

BACKGROUND

GPS trackers can be used for asset and animal tracking in remote environments. A tracking system can indicate the location of tagged pieces or species. This generally works by attaching a tag to an item or animal. By attaching the tag to the item or specimen, location is received, estimated and logged, the tag can transmit position to satellite. The receiver and transmission data can indicate the physical location of the tag and the corresponding item/animal.

GPS satellites broadcast microwave signals to enable GPS receivers on or near the Earth's surface to determine location and time, and to derive velocity. The system is operated by the U.S. Department of Defense (DoD) for use by both the military and the general public. GPS satellites broadcast signals that provide time of transmission which is used to generate a pseudorange used to measure the distance to the satellite, and navigation messages. The navigation messages include ephemeris data, used to calculate the position of each satellite in orbit, and information about the time and status of the entire satellite constellation.

GPS is one of several GNSSs. Other GNSS can be used in collaboration with GPS systems to provide precise location positioning anywhere on earth. GNSSs can work together, but the main difference between GPS only and a multi GNSS receiver is that multi-GNSS-compatible equipment can use navigational satellites from other systems besides GPS, and more satellites can mean increased receiver accuracy and reliability.

Each GPS/GNSS satellite can transmit microwave signals to the earth. GPS/GNSS receivers on the earth can use these signals to determine their locations, speed, direction, and time. A GPS/GNSS receiver may acquire satellite signals and navigation data, and calculate a position solution in approximately one minute.

GPS often transmit multiple signals on a given frequency separated by the different type of code used. GPS signals can include two types of ranging codes: an open code, such as the coarse/acquisition (C/A) code, that is published and can be accessible by the civil community, and a restricted precision code, such as the W or M code, usually reserved for military applications. GPS L-band frequency can provide positioning and timing information using these codes and navigation data messages that are carried by these codes. A carrier phase measurement can be made from the underlying carrier of these codes and can provide a more accurate measure of a range between a satellite and a receiver. There are two types of observables: pseudorange and carrier phase.

A GPS/GNSS receiver can extract GPS signal code phase for pseudorange measurements and carrier phase for carrier phase measurements. A receiver's navigation block can receive a constant data stream from each satellite and gather these data streams from multiple satellites simultaneously. For each satellite, it can find the ephemeris parameters which describe the actual satellite orbit.

Pseudoranges can be used in GPS receivers as a preliminary step toward the final determination of a position by a carrier phase measurement. The foundation of pseudoranges is the correlation of code carried on a modulated carrier wave received from a GPS satellite with a replica of that same code generated in the receiver. For L1 C/A, this measurement can determine the sub millisecond portion of the time of transmission while the data can be used to calculate the time of transmission in seconds and integer number of milliseconds. Classical pseudo range determined as the distance traveled by an electromagnetic signal over the time difference between the receiver measured time of arrival and full time of transmission (the combination of the sub millisecond and second/integer millisecond components). Hence, GPS receivers can determine pseudoranges from the C/A code provided it has decoded some of the navigation messages and have adequate track on the carrier.

SUMMARY OF THE INVENTION

System and methods for global positioning satellite (GPS)/global navigation satellite system (GNSS) based real time global asset tracking in accordance with embodiments of the invention are described. In an embodiment of the invention, a system for real time, fast, global asset tracking, includes: a server with a processor, a memory, and a network interface, where the memory includes a tracking application, where the tracking application directs the processor to: receive a message containing specific data from a tag; determine a time search window based on the message received from the tag; perform an initial position search; perform calculations for position and time, utilizing the time search window, the initial position search and satellite ephemeris information; and display a position information of the tag.

In an embodiment, a tag for real time global asset tracking includes: a microcontroller, a satellite communication subsystem, a navigation receiver, and at least one sensor, and a several antennas, where the tag is configured to receive GPS/GNSS data; and a memory containing an application, wherein the application directs the microcontroller to select one antenna from the several antennae for use in satellite communication.

In a further embodiment, the tag further includes a power management subsystem.

In a further embodiment, the tag includes several sensors, where the several sensors include salt water sensors, accelerometers, pressure sensors, and microphones.

In an embodiment, a system for real time global asset tracking, the system includes: a tag having a microcontroller; a server-side processor; a server-side memory containing a tracking application, where the tracking application directs the processor to: determine a time search window based on a message received from the tag; perform an initial position search; perform calculations for position and time, utilizing the time search window, the initial position search and satellite ephemeris information; and display a position information of the tag.

In a further embodiment, the tag further includes a satellite communication subsystem.

In still a further embodiment, the tag further includes several antennae.

In yet a further embodiment, tag further includes a memory containing an application, where the application directs the microcontroller to select one antenna from the several antennae for use in satellite communication.

In still a further embodiment again, the tag further includes a navigation receiver.

In a further embodiment again, the tag further includes a power management subsystem.

In yet a further embodiment again, the tag further includes a navigation receiver.

In still a further embodiment again, the tag includes several sensors, where the several sensors include salt water sensors, accelerometers, pressure sensors, and microphones.

DETAILED DESCRIPTION OF THE DRAWINGS

Figure 1:
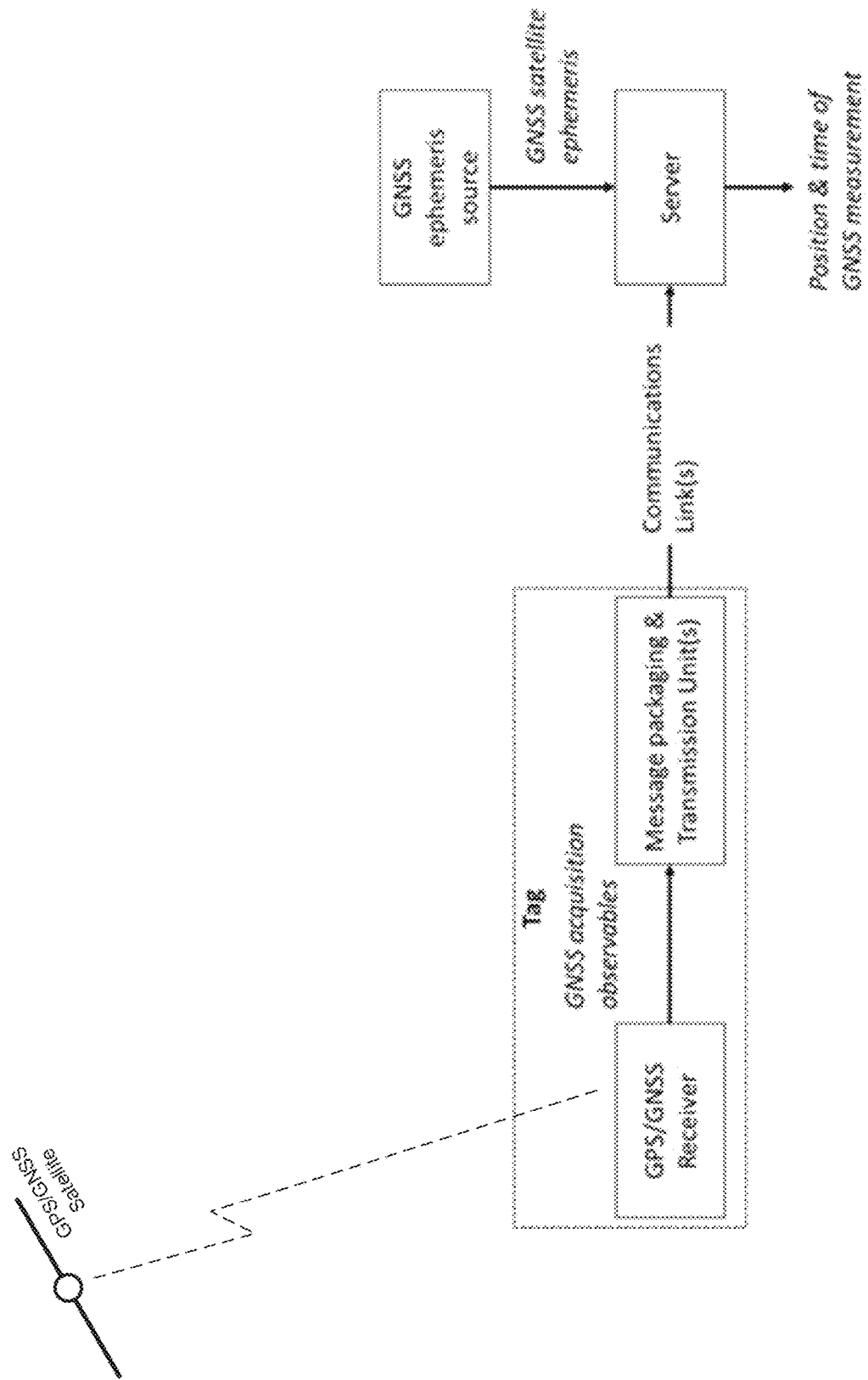
FIG. 1 illustrates a GPS/GNSS based tracking system architecture, used for generating tag message information and for calculating position/time in accordance with an embodiment of the invention.

Turning now to the drawings, systems and methods for GPS/GNSS based real time global asset tracking in accordance with various embodiments of the invention are illustrated. In many embodiments, systems and methods for GPS/GNSS based real time global asset tracking can provide rapid and reliable determination of a device located anywhere in the world by gathering short bursts of navigation satellite (such as, but not limited to, GPS and/or other Global Navigation Satellite Systems GNSS) measurements and communicating the derived information from the satellite navigation measurements via a global satellite network (such as, but not limited to, Iridium). In several embodiments, systems and methods for GPS/GNSS based real time global asset tracking can provide low power operations and can enable new applications such as, but not limited to, wildlife tracking, anti-poaching, and/or asset recovery in challenging and communications limited environments such as oceans, remote mountains, and/or the arctic/Antarctic.

In many embodiments, systems and methods for GPS/GNSS based real time global asset tracking can provide fast operations in order to obtain and transmit GNSS information, and can provide low power and intelligent utilization of client-side device, thus enabling small package size and long operational life. In various embodiments, a system including a client-side tracker device (such as a tag), and a position server can generate near real time positions rapidly by utilizing GPS/GNSS anywhere in the world. In certain embodiments, a GNSS unit of the tag may operate for a short period of time (for example, 3-7 seconds).

In several embodiments, systems and methods for GPS/GNSS based real time global asset tracking can provide near real time position reports derived from the remote tag, and can utilize observables from GNSS acquisition measurements from the remote tag. In various embodiments, a combination of the tag's onboard processing and a server-side's processing of GPS/GNSS data can provide time and position information. In many embodiments, systems and methods for GPS/GNSS based real time global asset tracking can provide methods to optimize communicated information in order to minimize a connection time to connect to a global real time satellite system (such as, but not limited to, Iridium). In certain embodiments, systems and methods for GPS/GNSS based real time global asset tracking can employ at the server-side assistance information from other stations and intelligent search and optimization processes to determine positions rapidly and accurately from the client-side observables. In many embodiments, position determination can be performed by utilizing coarse time and coarse initial position estimates. In certain embodiments, position determination processes can employ coarse time GNSS position determination adapted to handle challenges and conditions of marine tracking. In various embodiments, systems and methods for GPS/GNSS based real time global asset tracking can include packaging GNSS information to minimize the connection time for satellite communication.

In several embodiments, systems and methods for GPS/GNSS based real time global asset tracking can utilize intelligent sensing to provide position reports efficiently in a marine environment. In certain embodiments, systems and methods for GPS/GNSS based real time global asset tracking can provide activation of the tag and capturing of GNSS data based on sensing near and/or above the ocean surface. In various embodiments, systems and methods for GPS/GNSS based real time global asset tracking can provide rapid communication by utilizing an antenna determination process for optimal satellite communications link, where the tags perform an antenna selection process to determine one or more antennas that are likely to be able to provide the best link to a communication satellite. In many embodiments, the tracking tag can include multiple antennas, and GNSS measurements can be used to determine the best antenna visibility to the sky in order to establish the best link to communication satellites. In several embodiments, systems and methods for GPS/GNSS based real time global asset tracking can provide low power usage for GPS/GNSS measurements and for communicating to communication satellites. In certain embodiments for aquatic use, power management methods can be based on behavioral or environmental triggers based on conductivity as measured from marine environments (e.g. in water, near surface of ocean, out of water, etc.).

In various embodiments, commercial off the shelf (COTS) or consumer GNSS chips can be utilized to manage power usage based on factors including (but not limited to) behavior of an object and/or a human, in any environment including (but not limited to) human environments (e.g. urban, indoor, outdoor).

While specific systems and methods for GPS/GNSS based real time global asset tracking are described above, any of a variety of systems and methods for GPS/GNSS based real time global asset tracking can be utilized in accordance with various embodiments of the invention. Systems and methods for GPS/GNSS based real time global asset tracking are disclosed further below.

System Overview

In various embodiments, systems and methods for GPS/GNSS based real time global asset tracking can include a server-side position determination process based on coarse time GNSS techniques that can minimize the amount of information and the time for establishing communications at the GNSS receiver/tag, and that may not need a priori information about approximate position and/or time from outside sources, as illustrated in FIG. 1 to derive the position/time of the tag. In the illustrated embodiment, GNSS observables employed can include acquisition code phase and satellite number (henceforth referred to as the tag message information). These observables can be determined in the first few seconds of the tag's operation. While specific systems and methods for GPS/GNSS based real time global asset tracking are described above as regards to FIG. 1, any of a variety of systems and methods for GPS/GNSS based real time global asset tracking can be utilized in accordance with various embodiments of the invention.

Figure 2:
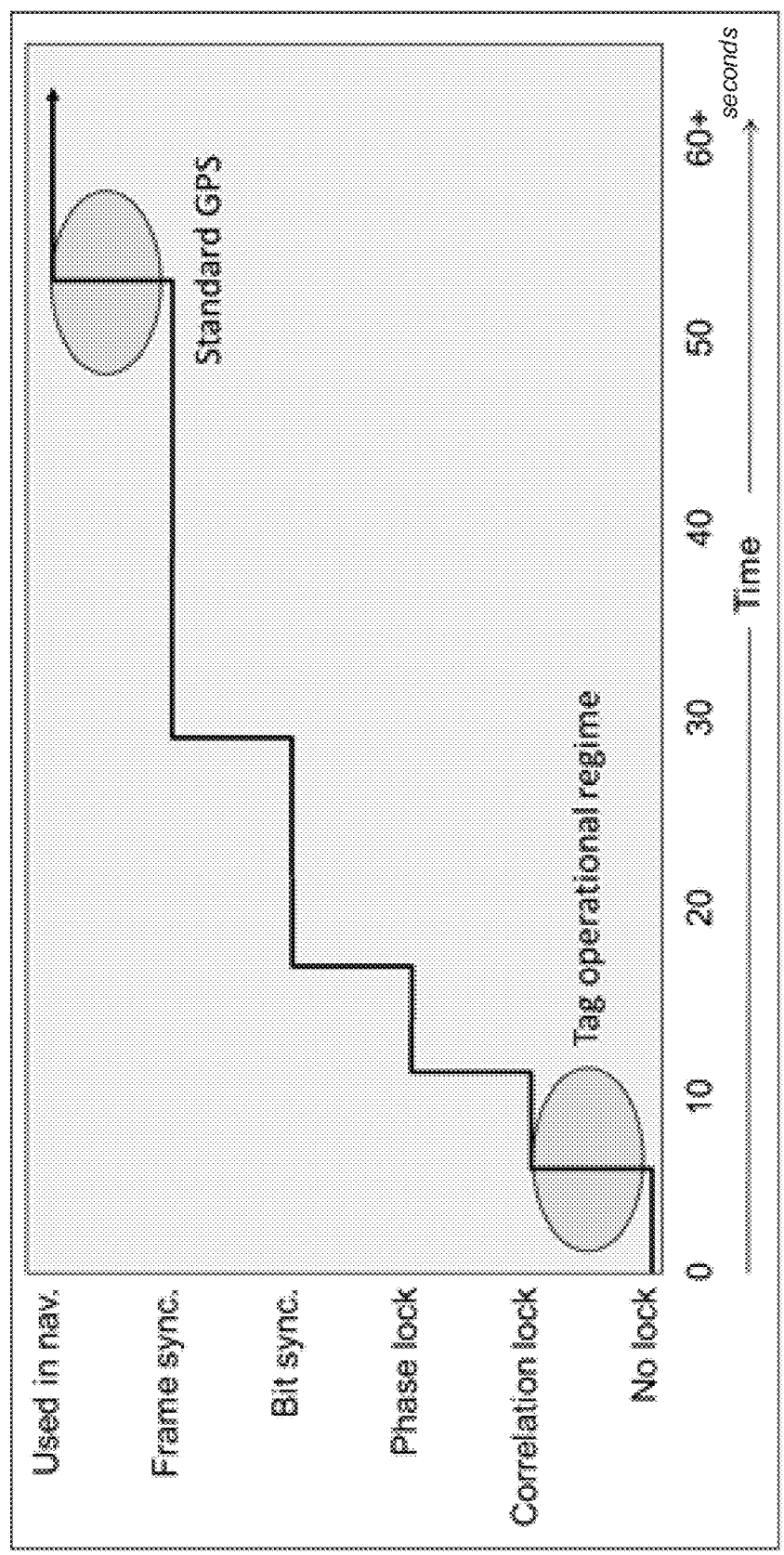
FIG. 2 conceptually illustrates a tracking tag's utilization of GNSS operations as a function of time in accordance with an embodiment of the invention.

In several embodiments, to determine GNSS positioning, receiver/tag can perform a series of steps in order to get to pseudoranges, as well as navigation data such as ephemeris in order to calculate a position. This is illustrated in FIG. 2. In various embodiments, in order to determine GNSS positioning, the receiver/tag may skip performing steps in a typical series of steps used to obtain pseudoranges and navigation data. Rather information gathered from the search for the signal, known as acquisition, can be used. These steps are illustrated in FIG. 2. As shown in the illustrated example, the tracking tag can achieve operational readiness within a short time, which can be less than 10 seconds (e.g. 3-7 seconds). The ability to perform with only a brief GNSS receiver operating period can be achieved by use of acquisition code phase rather than traditional pseudoranges as the later needs decoding of the time of transmission from the satellite and hence takes more time to derive. Comparatively, a standard GPS may take much longer to accomplish this, for example one minute to get a position. After the completion of GNSS operations, rapid readiness can be achieved by having a generated tag message information that can fit in a short message service (SMS) that is provided to a communications link such as Iridium. In some embodiments, the number of satellites is minimized and capped in order to further expedite operations. While specific operational steps and operational time are described above as regards to FIG. 2, any of a variety of operational steps and timing can be utilized in accordance with various embodiments of the invention.

Figure 3:
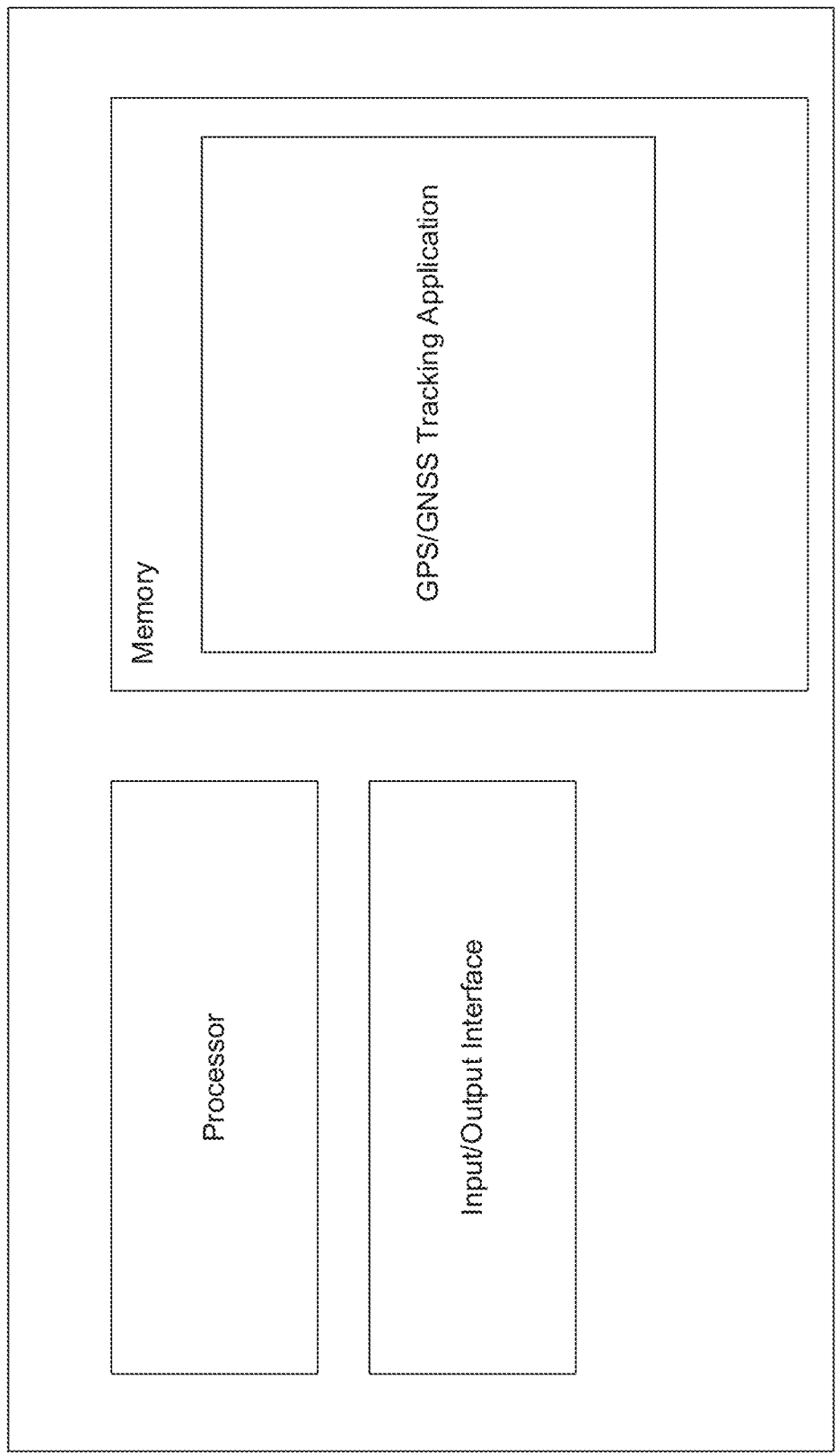
FIG. 3 is a block diagram of a system for implementing a tracking application in accordance with an embodiment of the invention.

In many embodiments, systems and methods for GPS/GNSS based real time global asset tracking include a server-side processor and a memory containing an application for GPS/GNSS based asset tracking, as illustrated in FIG. 3. The server-side application can solve for position given large uncertainties in time and position estimates. This is done by using information received from individual tags and a search process that is part of the application. The tracking application can direct the processor to determine a time search window of possible reception times based on a message received from the tag, perform an initial position search, perform calculations for position and time utilizing the time search window, the initial position search window and satellite ephemeris information, and display a position information of the tag. Additionally, both packaging and processing can be aided by assumptions such as the tag's operating environment, for example as assumption that the tag is operating on ocean surface.

Figure 4:
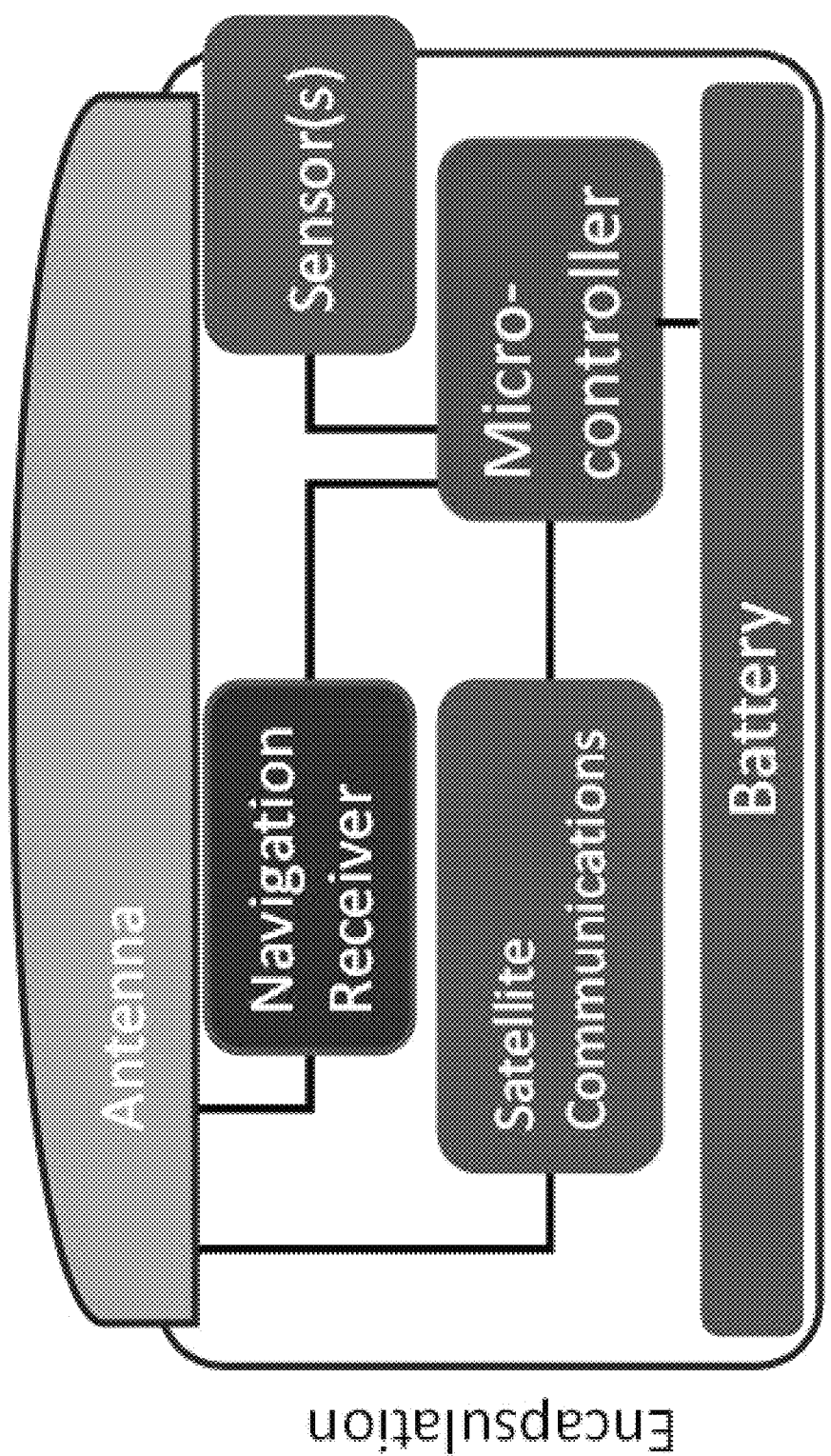
FIG. 4 conceptually illustrates components of a tracking tag in accordance with an embodiment of the invention.

In accordance with an embodiment of the invention, the tracking tag can include, but not limited to, five subsystems: at least one sensor (such as salt-water sensor, and/or other sensors such as accelerometers, pressure sensor, microphone, thermistor), a microcontroller, a navigation receiver, a communication subsystem, and a power subsystem, as illustrated in FIG. 4. In the illustrated embodiment, the sensors and a low power microprocessor can be employed to manage power utilization of the tag. In some embodiments, the tag can further include a memory containing an application. The microcontroller can determine desired trigger conditions using the various sensors, and can power up the tag, specifically activating a navigation (GPS and other GNSS) receiver. While specific tracking tags are described above as regards to FIG. 4, any of a variety of tracking tag implementations can be utilized in accordance with various embodiments of the invention.

In various embodiments, a tag activation process can be employed to allow for faster operations and for longer window for operation of GNSS. In many embodiments, GNSS can be received within a few tens of centimeter under water. Pressure, light, and/or other sensors can be used to determine a water depth where GNSS communication can be established, and can trigger tag activation even before, for example, a marine animal surfaces out of water. In certain embodiments, a tag can be activated and establish GNSS communication under the surface of water, without the tag surfacing. In several embodiments, data gathered can be utilized by a navigation receiver while acquiring a communication signal. The tag can then send that information via a world-wide communications link to a ground processing station. The ground processing stations can process the information provided by the tag along with information gathered from GNSS reference stations in order to derive an accurate location of the tag.

Figure 5:
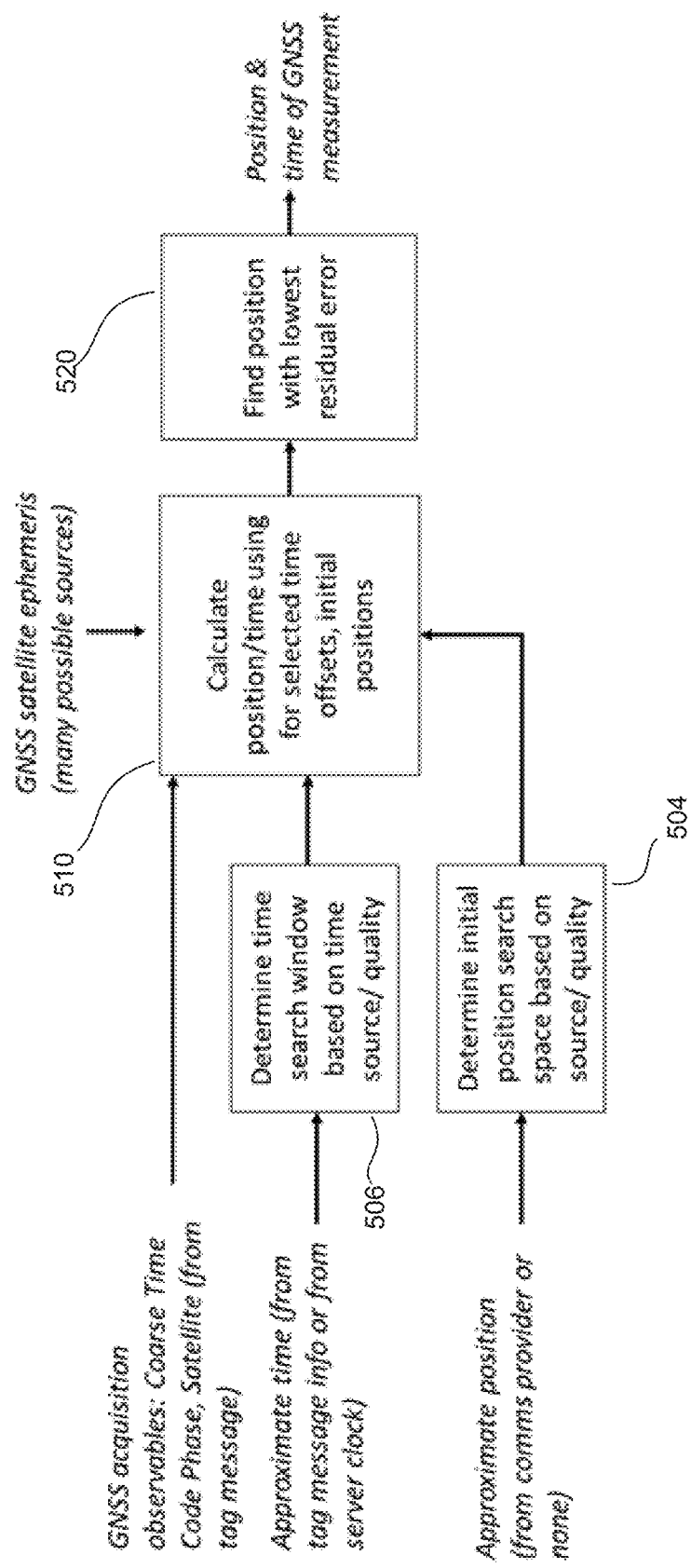
FIG. 5 illustrates a server-side processing architecture for position/time calculation using a tag message information in accordance with an embodiment of the invention.
Figure 6:
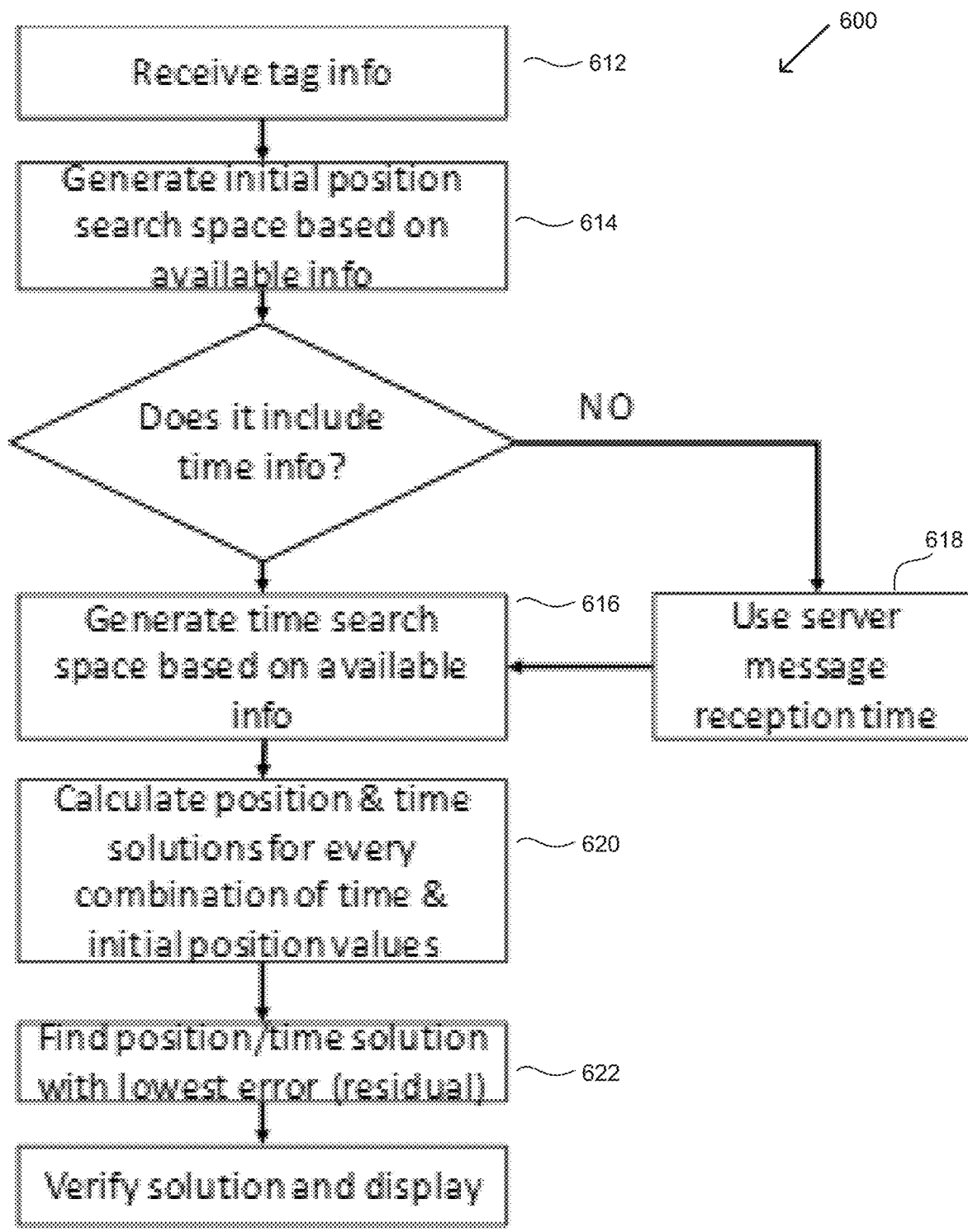
FIG. 6 is a flow diagram illustrating a server-side process for position/time calculation from tag message information in accordance with an embodiment of the invention.

In several embodiments, tracking tag message information can be provided to a server. The server can have ephemeris data. which it can obtain from other sources rather than the satellite signal at the tracking tag (or from a different device at a different location), thus reducing GNSS operation time. Broadcast GNSS ephemeris data typically contains the six classical Keplerian parameters that describe orbits, perturbations parameters (such as the rate of change of different Keplerian parameters and correction coefficients) and time parameters that specify reference time, time of applicability, clock drift and others. Other sources for ephemeris information can include, for example, a local GNSS receiver, a network GNSS receiver, or cloud sources such as International GNSS Service (IGS). These other sources may present the information in a different manner or may have additional elements for a more accurate satellite position determination. In various embodiments, a search technique can allow for the determination of an accurate solution using the tracking tag message information even without an approximate knowledge of the tag's location and time from the communication service provider. A GNSS measurement processing that can be utilized in various embodiments of the invention is illustrated in FIGS. 5 and 6. This processing can handle the acquisition code phase as these measurements differ significantly from pseudo ranges. Coarse location and time may be available from information provided by a satellite communication service provider (e.g. Iridium). If not available, as shown in 506, the server reception time can be used to formulate an approximate time. A possible range can be calculated for the true time of tag GNSS operations ("true time") and a set of possible times can be generated for further examination. An initial position search can be performed as shown in 504. Subsequently, solutions for a set of possible times and locations can be calculated as shown in 510. From those possible solutions, a best solution can be found using quality metrics such as error residuals to determine an actual position and time as shown in 520. In the event that the time and/or approximate position from the satellite system is available, that information can be used to refine a range of possible true times and initial positions to inspect.

As shown in flow diagram 600, a tag information is received in step 612. Based on available information, initial position search space and time search space can be generated as shown in 614 and 616, respectively. If the tag information does not include time data, server reception time can be used to derive possible initial estimates of true time as shown in 618. Next, position and time solutions for every combination of initial position and time values can be calculated as shown in 620. From those possible solutions, a best solution can be found using quality metrics such as error residuals to determine an actual position and time as shown in 622.

While specific GNSS measurement process is described above as regards to FIGS. 5 and 6, any of a variety of GNSS measurement processes can be utilized in accordance with various embodiments of the invention.

Figure 7:
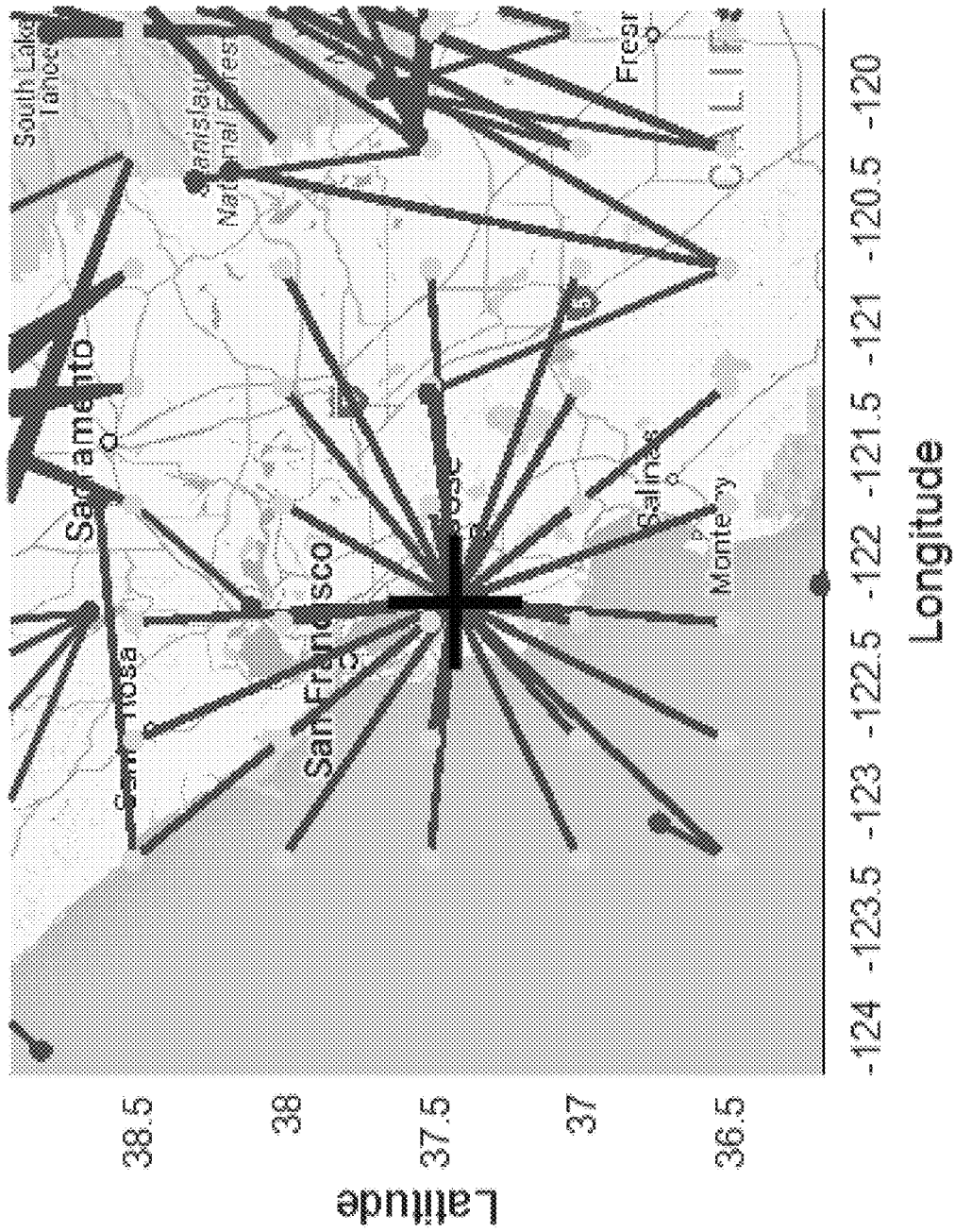
FIG. 7 is a plot of calculated position solution resulting as a function of an initial position latitude and longitude.
Figure 8:
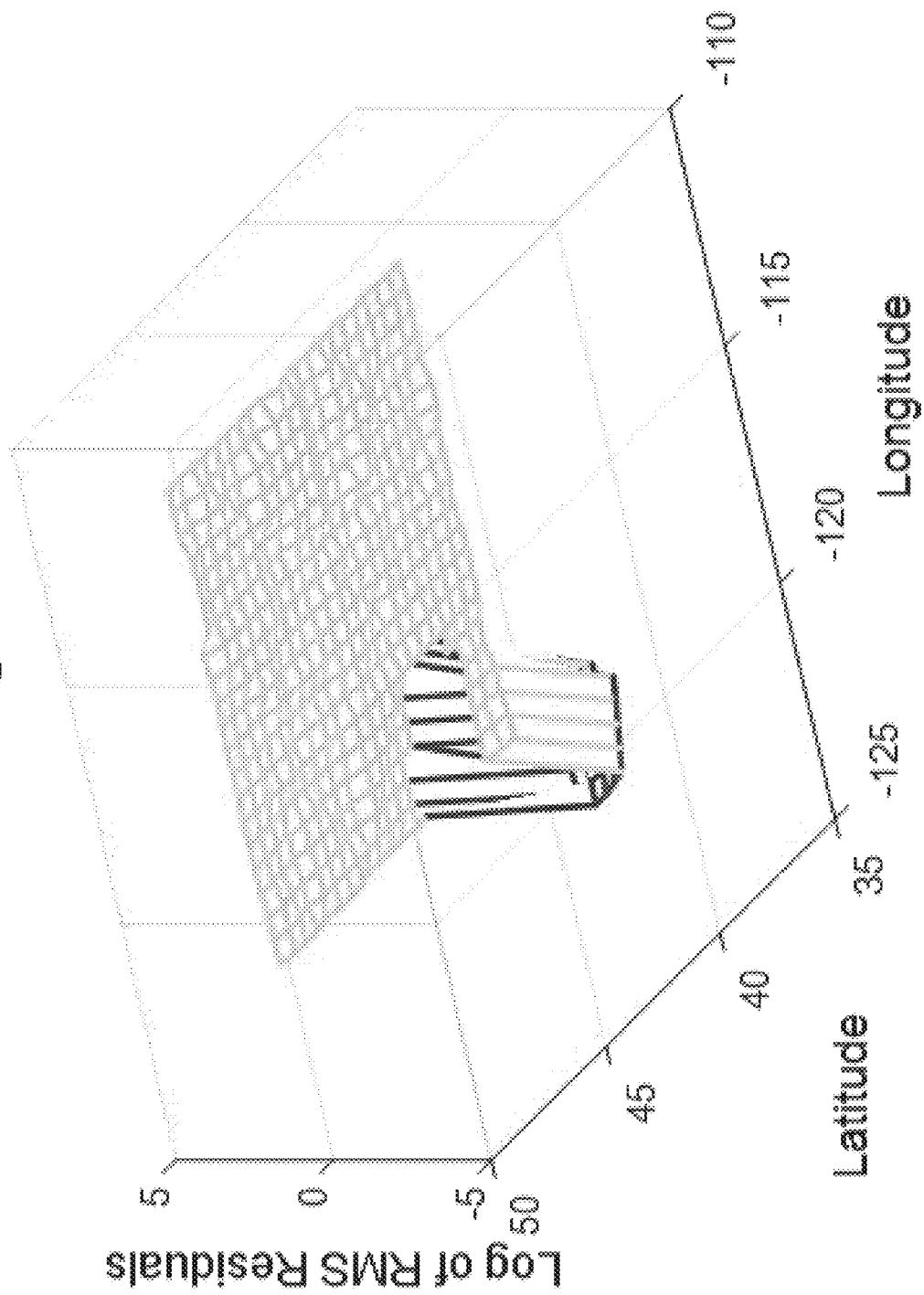
FIG. 8 is a plot of error residuals from a search process over a large area (approximately 900×900 miles$^2$).

A visualization of GNSS search process using a grid of possible initial positions is illustrated in FIG. 7 in accordance with an embodiment of the invention. The relationship between an initial position (yellow dots) and resulting derived position (blue dot, connected by line) is shown in FIG. 7. In the illustrated example, the target position is at Stanford, Calif. has latitude and longitude of 37.4 North and −122.5 East. Note that the specific number for latitudes and longitudes can vary. Calculated error residuals for the position solution resulting from each initial position is plotted in a mesh as function of the initial position latitude and longitude as illustrated in FIG. 8 in accordance with an embodiment of the invention. As can be seen in FIG. 8, initial positions that result in the correct solution have very low error residuals. While specific GNSS search process is described above as regards to FIGS. 7 and 8, any of a variety of GNSS search processes can be utilized in accordance with various embodiments of the invention. Position determination process is disclosed further below.

Efficient Position Determination Process

Figure 9:
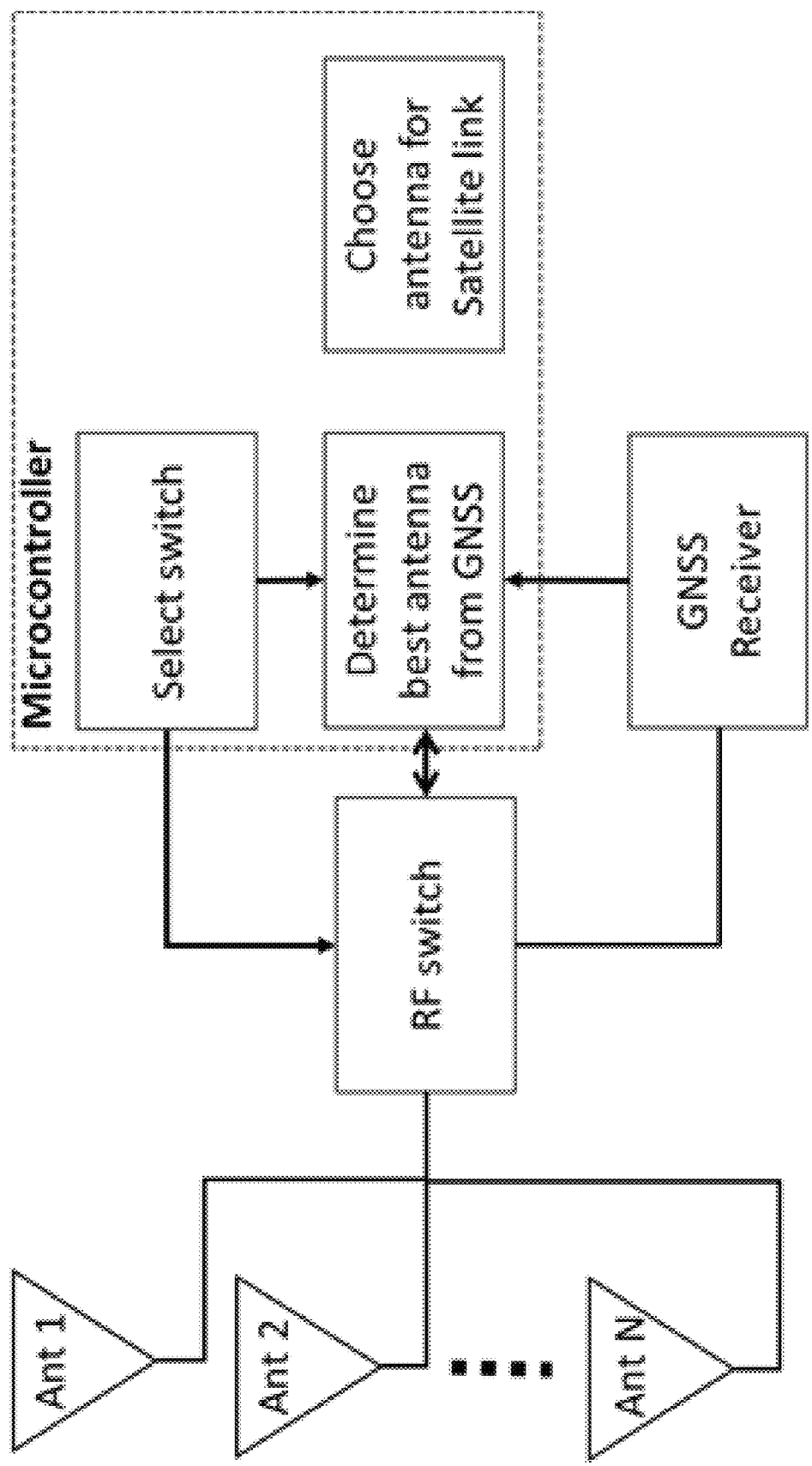
FIG. 9 conceptually illustrates the architecture of a tracking tag that includes multiple antennas and enables rapid selection of an antenna for satellite communications in accordance with an embodiment of the invention.
Figure 10:
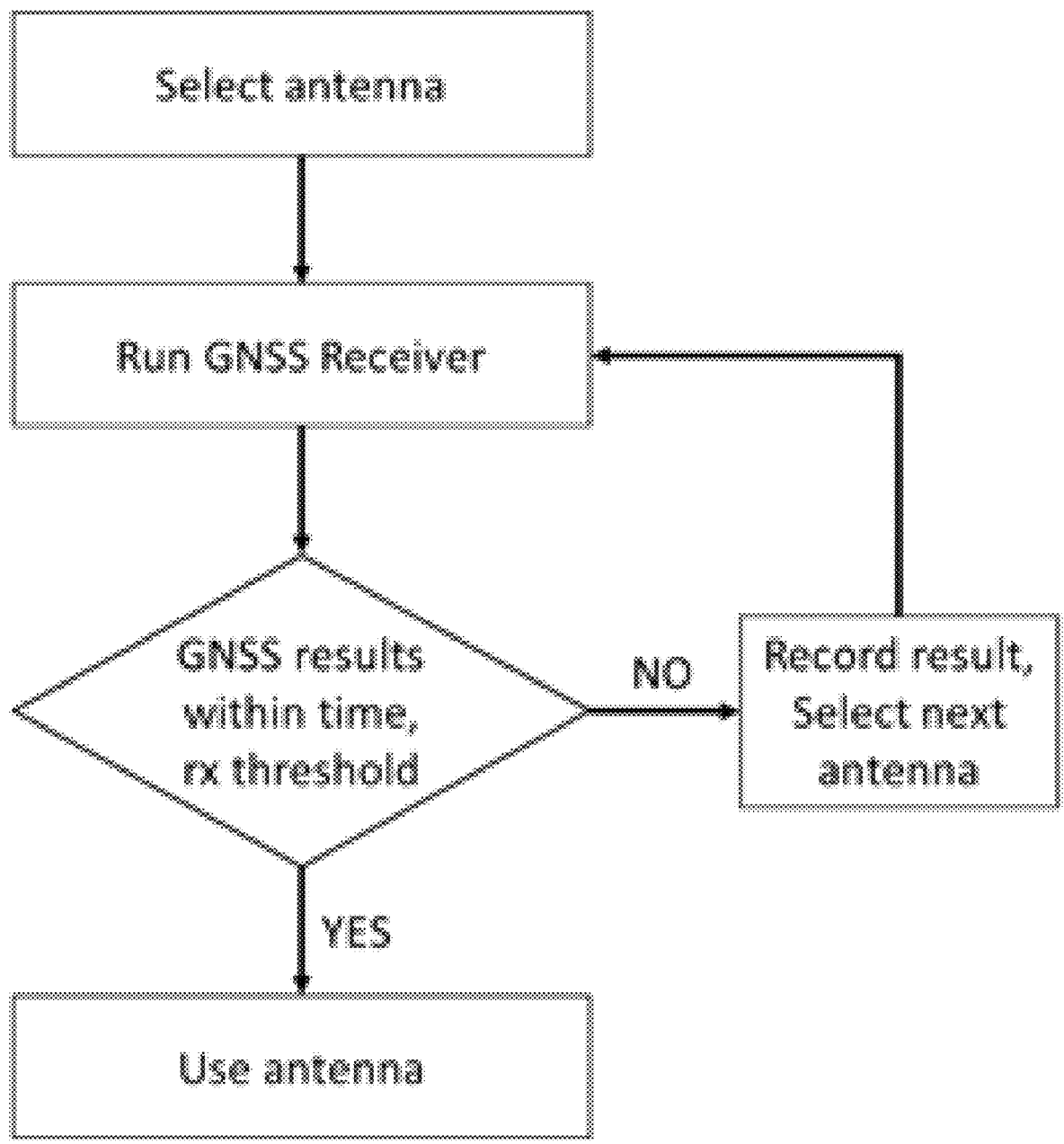
FIG. 10 is a flow diagram illustrating a process to rapidly selecting an antenna from a set of antennas in the tracking tag for use in satellite communications in accordance with an embodiment of the invention.

In many embodiments, GNSS position determination can be sped up by hastening the satellite communication time. In several embodiments, data can be fitted into a minimum packet size which minimizes the amount of connection time needed. Connection strength can be maximized by using GNSS data in order to determine which of the tag's antennae to use as illustrated in FIG. 9 in accordance with an embodiment of the invention. A strong and fast GNSS communication can indicate that a selected antenna is in a proper direction relative to the sky. In various embodiments, multiple antennae each facing different directions can be used for GNSS. In operating the GNSS receiver, the tag can switch each of the antennae until one can be found that provides suitable GNSS results as indicated by several metrics (reception time, and signal strength). An antenna section process flow diagram is shown in FIG. 10 in accordance with an embodiment of the invention. In the illustrated flow diagram, a receive threshold can be determined based on GNSS reception metrics. While specific antenna selection processes are described above as regards to FIGS. 9 and 10, any of a variety of antenna selection processes can be utilized in accordance with various embodiments of the invention.

Figure 11:
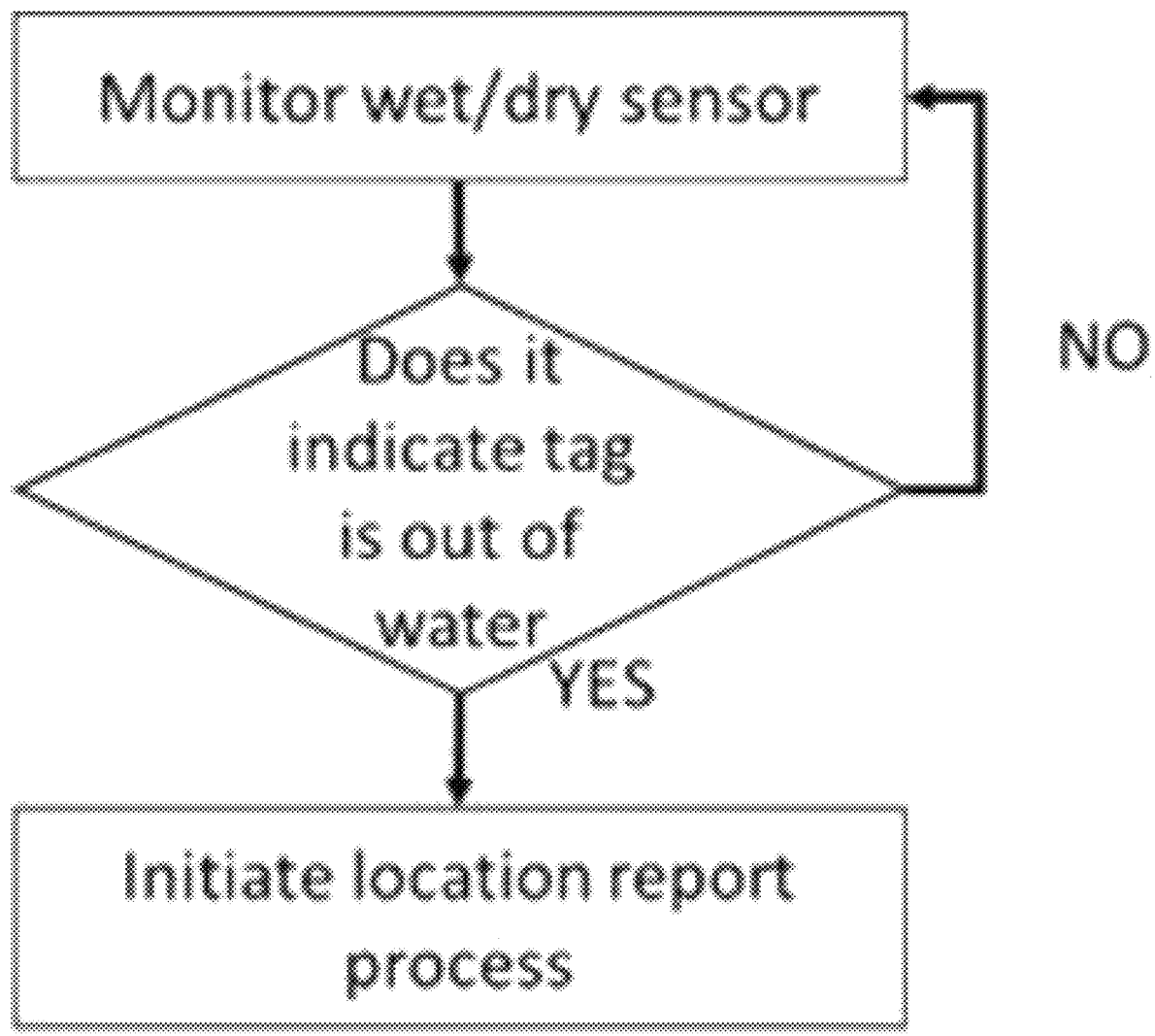
FIG. 11 is a high-level flow diagram for a process performed by a tracking tag for activating full capability and initiating a location reporting process in accordance with an embodiment of the invention.
Figure 12:
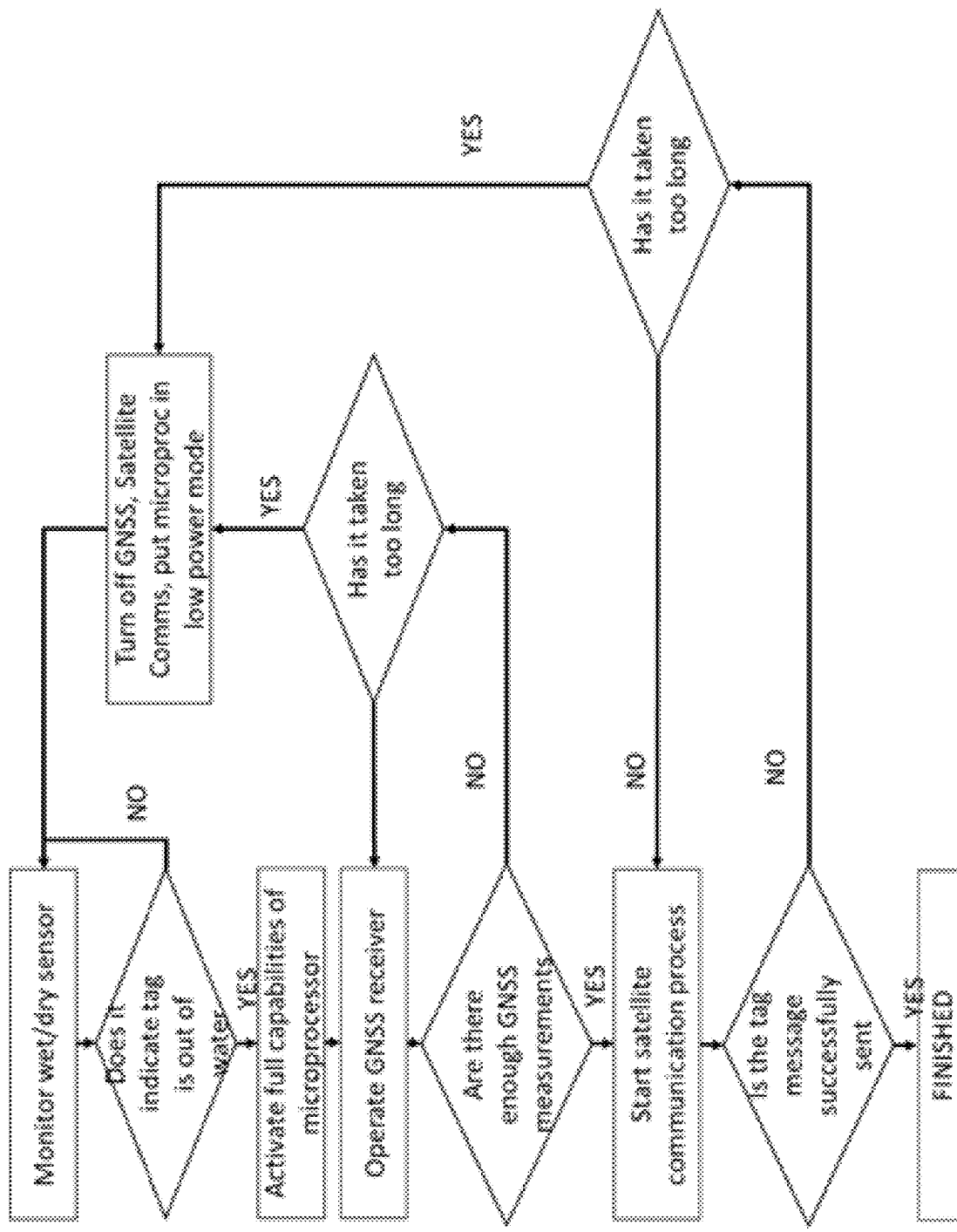
FIG. 12 is a flow diagram of a process performed by a tracking tag for activating full capability, and processing and sending a location report in order to manage power in accordance with an embodiment of the invention.

In various embodiments, application specific intelligence can be employed for position/reporting operations in order to reduce power usage and to increase opportunities for location determination. Smart detection of opportunities for activation and position reporting can be utilized to minimize power consumption and maximize the tracking tag's position utility as illustrated in FIG. 11 in accordance with an embodiment of the invention. In the illustrated flow diagram, the tag may not operate unless it is in a situation where it can or needs to get a position, i.e. the GPS/GNSS signal is receivable. The tracking tag can make several decisions based on the outcome of different sensors and components in order to limit power consumption as illustrated in FIG. 12. In the illustrated flow diagram, a sensor (wet/dry) can activate the tag when its measures the tag being out of water. The microcontroller manages the operations by operating the GNSS receiver until enough measurements are available, and then proceeds by packaging the measurements in the smallest packet possible, and finally starts the communications with satellites. At each step, there is a time out to ensure that battery is not fruitlessly used for too long. While specific application specific intelligent process is described above as regards to FIGS. 11 and 12, any of a variety of application specific intelligence processes can be utilized in accordance with various embodiments of the invention.

Figure 13:
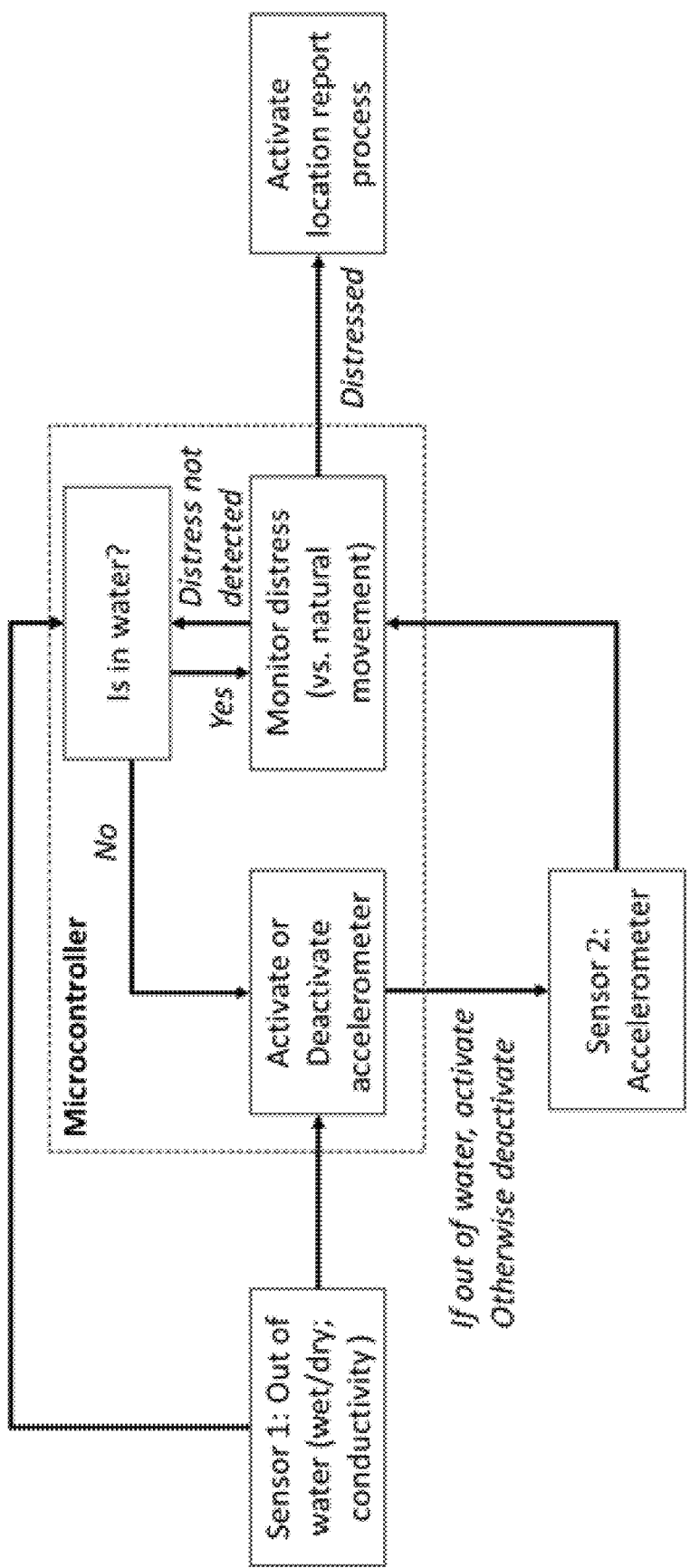
FIG. 13 conceptually illustrates an architecture for a tracking tag used for activating full capability of the tag and initiating a location reporting process utilizing an out of water (wet/dry) sensor and an accelerometer (acceleration sensor) in accordance with an embodiment of the invention.
Figure 14:
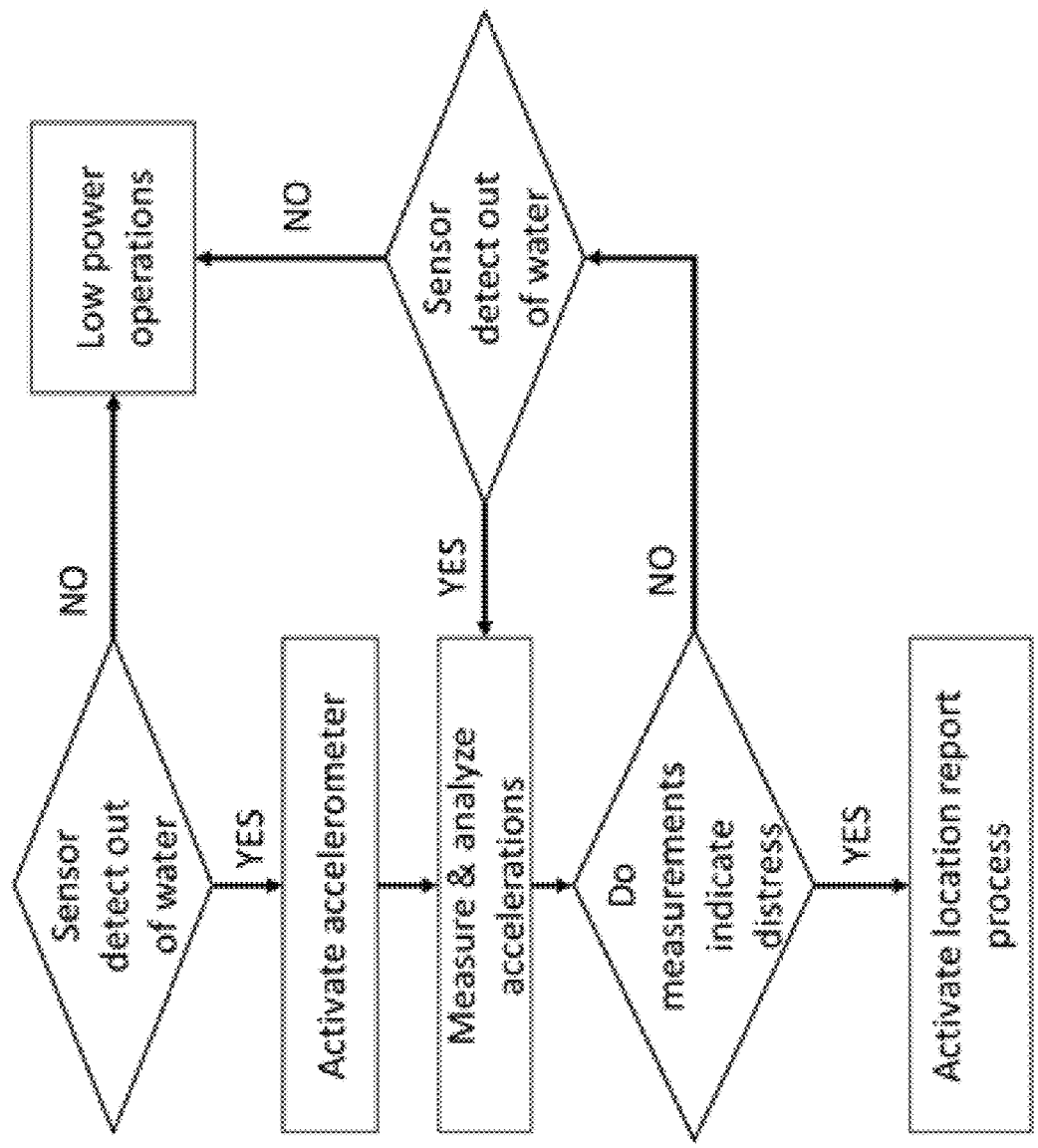
FIG. 14 is a flow diagram of a process performed by a tracking tag for activating the full capabilities of the tag and initiating a location reporting process using an out of water (wet/dry) sensor and an accelerometer (acceleration sensor) in accordance with an embodiment of the invention.

In several embodiments, the tracking tag may not engage in position acquisition even if it is in a position to do so. For example, a tag that reports position only if a tagged marine animal has been caught need not report natural surfacing events which can save power. In certain embodiments, additional sensors can be used to supplement the primary sensor (wet/dry sensor—sensor 1) when needed. Since some sensors, such as accelerometers, draw power when operating, the tag minimizes power consumption by only activating those sensors when the primary sensor(s) (sensors that can be always on) provide results which makes the use of additional sensors necessary for the tag's decision-making processes, as illustrated in FIG. 13 in accordance with an embodiment of the invention. An example process flow using two sensors is illustrated in FIG. 14. In the illustrated example, wet/dry (out of water) and accelerometer sensors are utilized. The wet/dry sensor can always be active as it can operate on low power. Once it detects the device is out of water, it can activate other sensors, such as the accelerometer sensor, and can proceed to check to determine behavior based on the profiles from each sensor or combination thereof. For example, if accelerations suggest the tagged animal has been caught, then the location report process is initiated. If it does not, then the device keeps checking until the device re-enters the water. This check can be expanded upon both by the behaviors checked and the sensors used. It can be augmented by more specific knowledge about the behavior of the species of the tagged animal. While specific sensor usage processes are described above as regards to FIGS. 13 and 14, any of a variety of sensor usage processes can be utilized in accordance with various embodiments of the invention.

Figure 15:
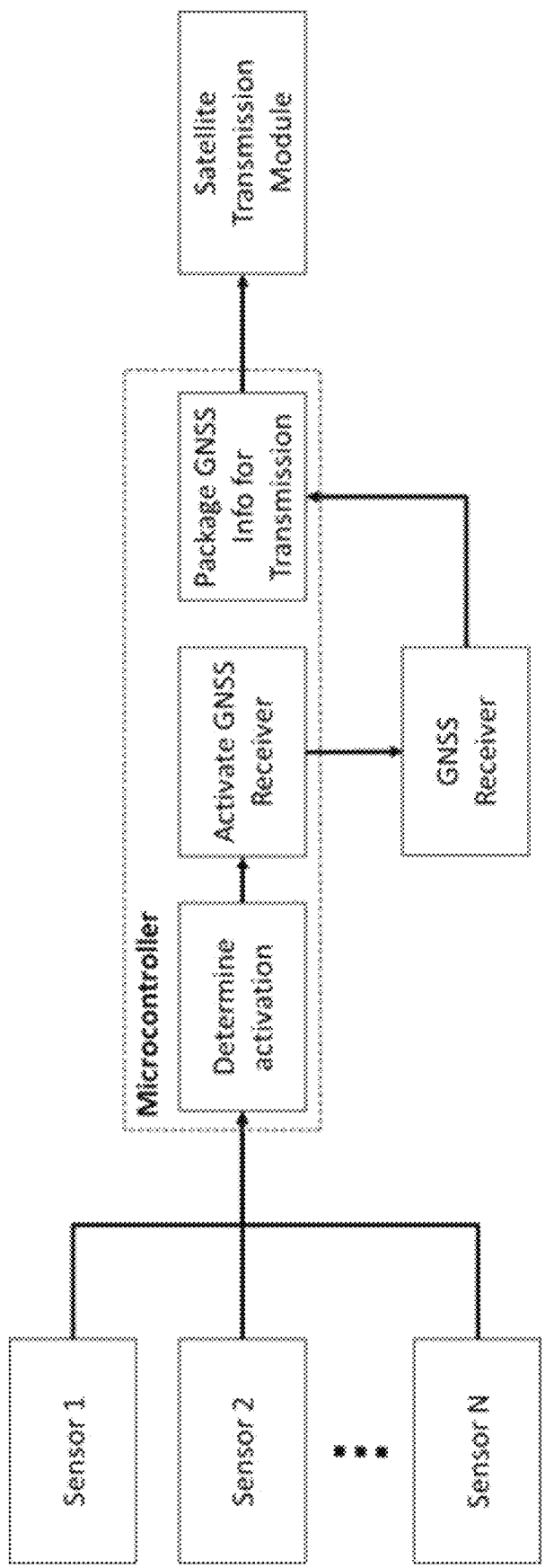
FIG. 15 conceptually illustrates a tag architecture for activating full capability and initiating location report process using multiple sensors in accordance with an embodiment of the invention.
Figure 16:
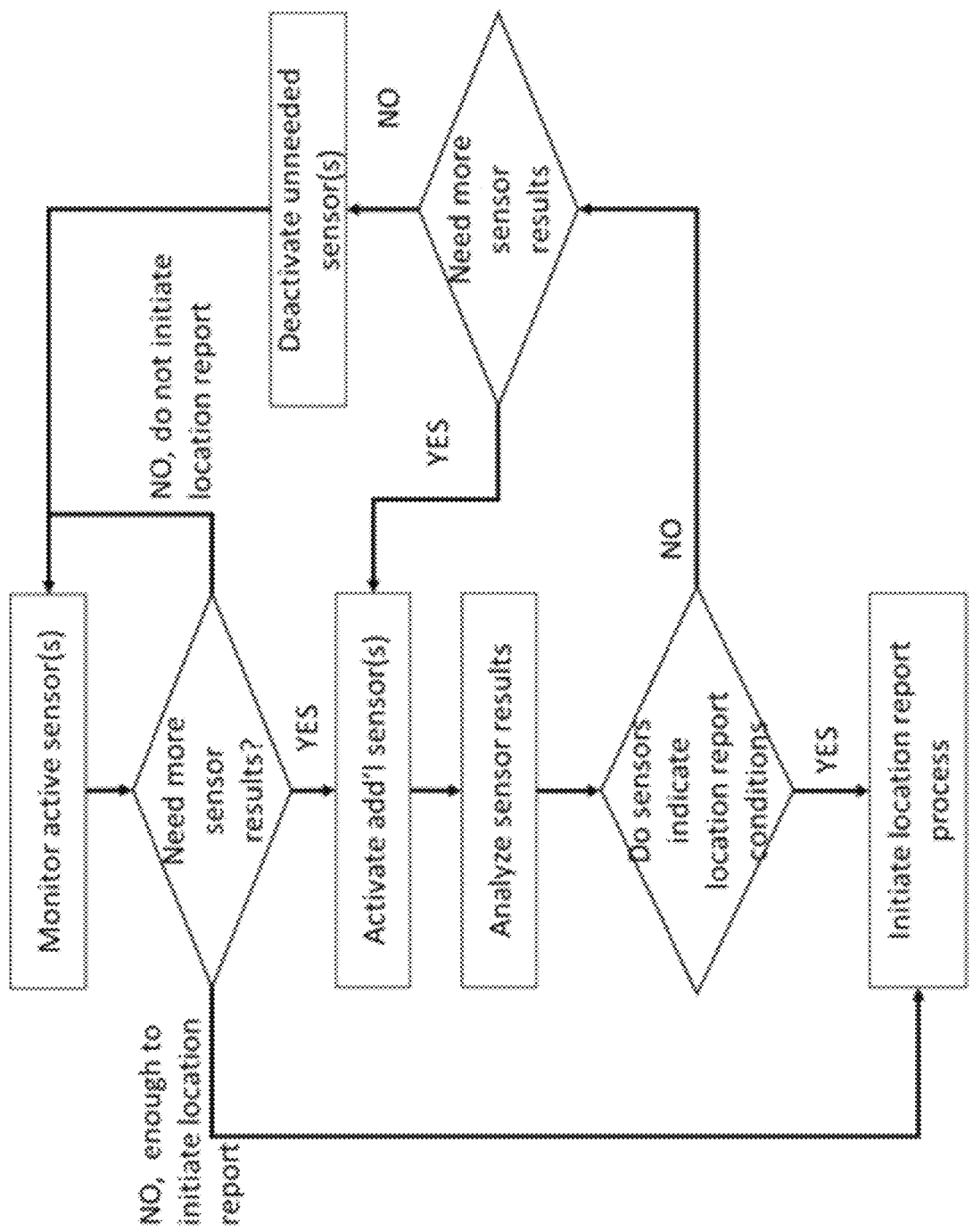
FIG. 16 is a flow diagram of a process performed by a tracking tag for activating the full capabilities of the tag and initiating a location reporting process using multiple sensors in accordance with an embodiment of the invention.

An architecture of the tag in accordance with an embodiment of the invention is illustrated in FIG. 15. In the illustrated embodiment, sensors can provide inputs to the microcontroller, which can contain applications to determine activation and to package GNSS information. A process flow diagram showing the steps involved in order to initiate position location process is illustrated in FIG. 16, which shows a general operations process that can monitor and activate a location report process. In the illustrated process, the steps of examining sensor results and developing necessary tag activation information can be included. For example, the activation determination can be based on examination of the sensor results, or on supplementing the information with measurements of additional sensors. This sensor architecture can enable increased opportunities to conduct positionings. In the illustrated example, other sensors can also detect when the tag may be able to generate the tag GNSS location information despite the tag being in the water. Generally, GNSS may be operated a few centimeters below the surface of the water. In many embodiments, combination of sensors (such as light, pressure) can be used to activate detection of and determine such conditions further increasing the GNSS operational window and positioning opportunities. While specific tag architectures and associated processes are described above as regards to FIGS. 15 and 16, any of a variety of specific tag architecture and/or processes can be utilized in accordance with various embodiments of the invention.

Figure 17B:
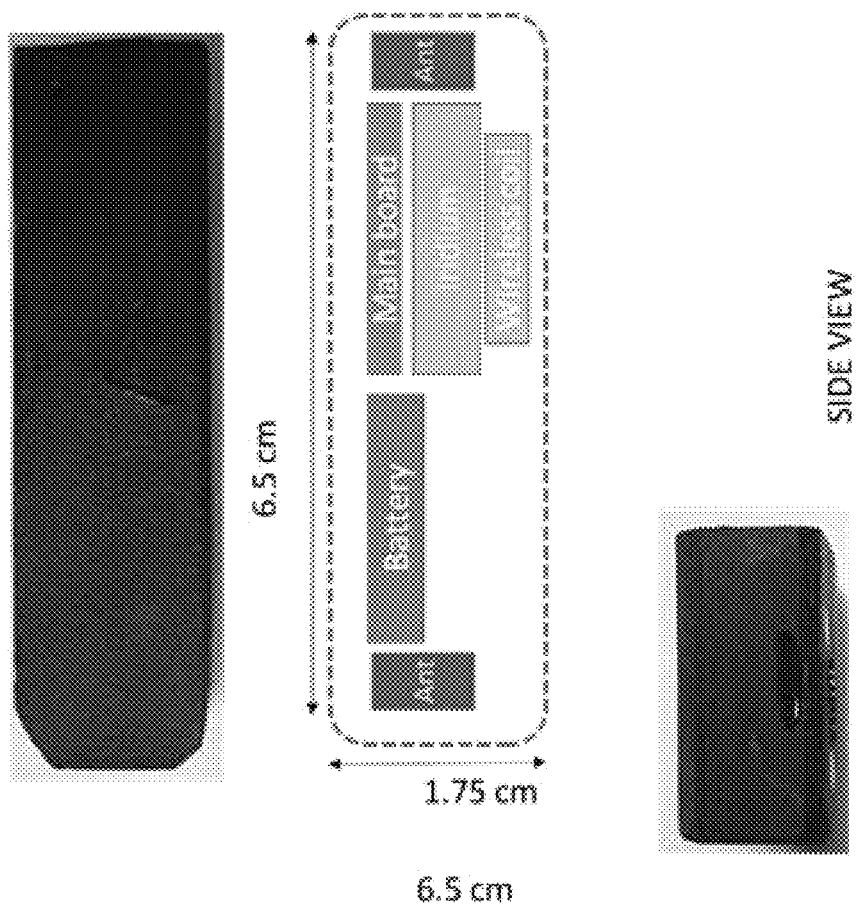
FIGS. 17A and 17B show top and side views of an encapsulated tag with form factor and component locations conceptually illustrated in accordance with an embodiment of the invention.
Figure 17A:
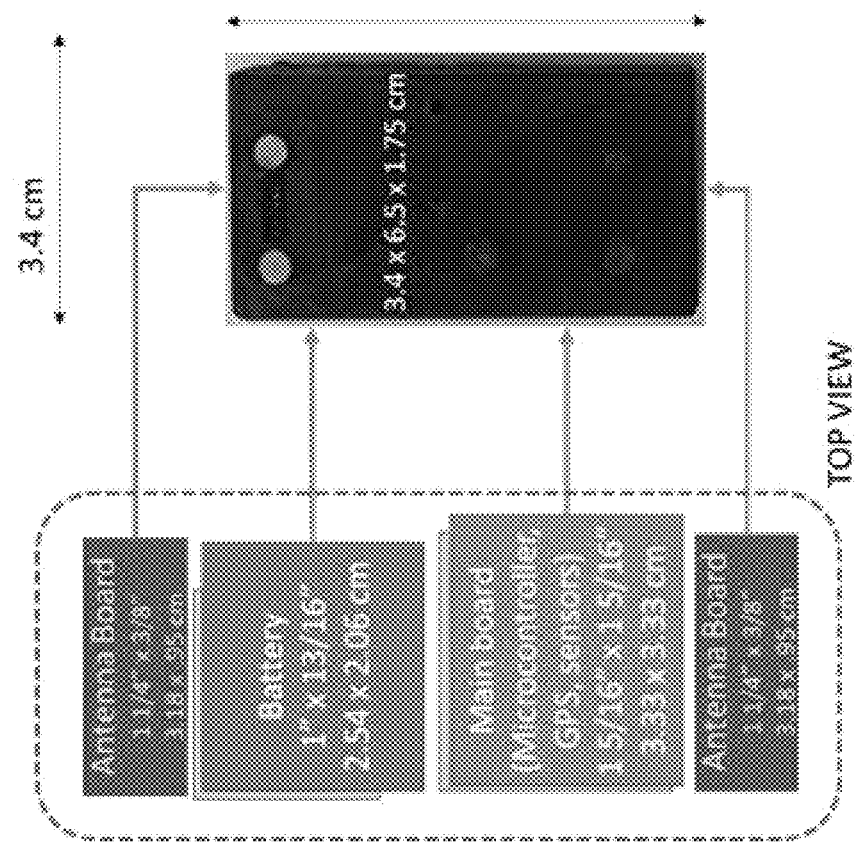
Figure 18:
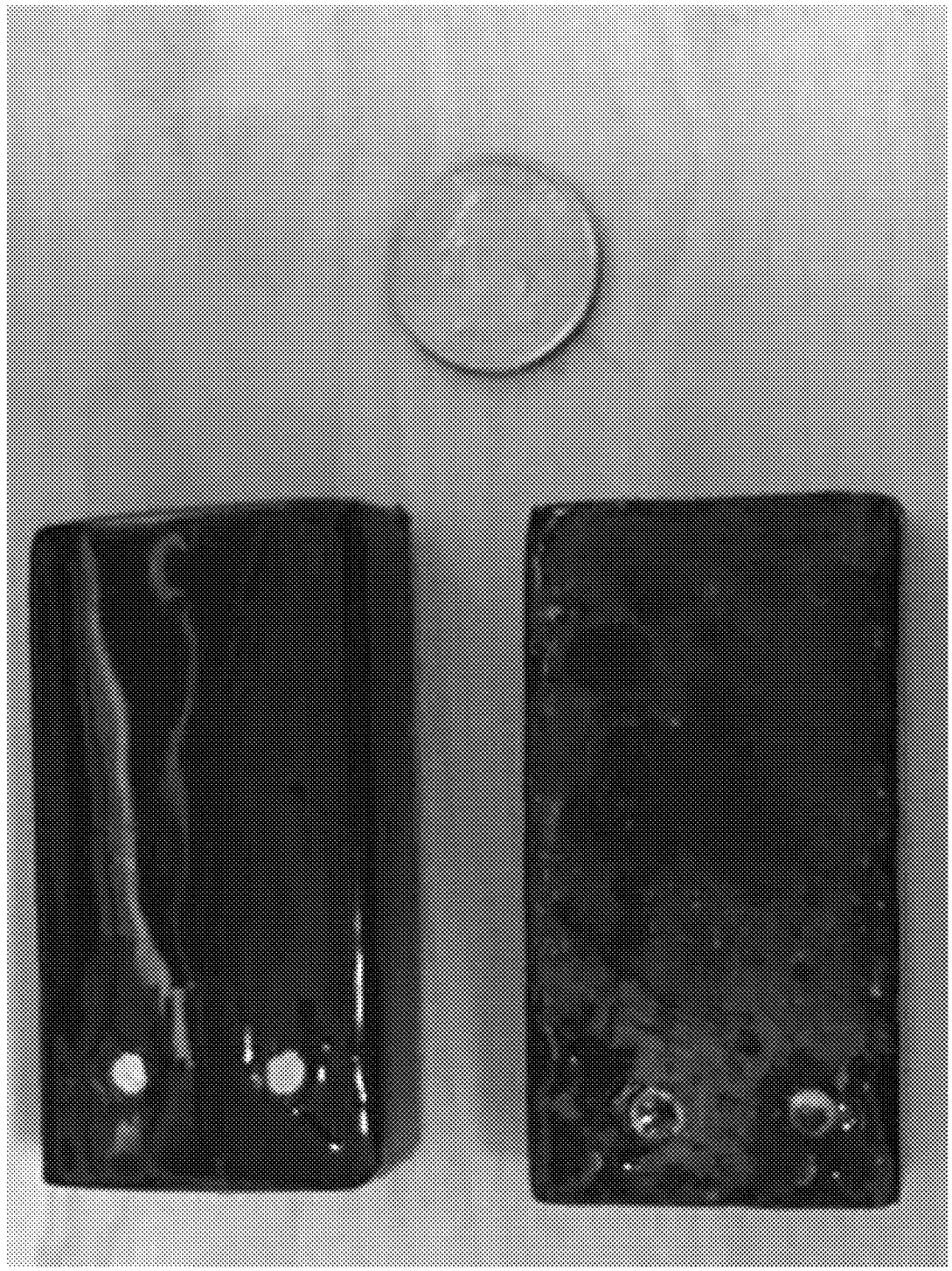
FIG. 18 shows a photograph of a fabricated tag in accordance with an embodiment of the invention.

In many embodiments, a client-side tag can be built with off-the-shelf components as shown in in FIGS. 17A (top view) and 17B (side view). The illustrated client-side tag can work and survive in an ocean environment to depths of 1000-2000 meters, which is the equivalent of 100-200 times the pressure experienced on land. A photograph of the client-side tag is shown in FIG. 18 in accordance with an embodiment of the invention. The illustrated client-side tag can perform on land and in water. While specific fabricated client-side tags are described above as regards to FIGS. 17A, 17B and 18, any of a variety of fabricated client-side tags can be utilized in accordance with various embodiments of the invention.

Figure 19:
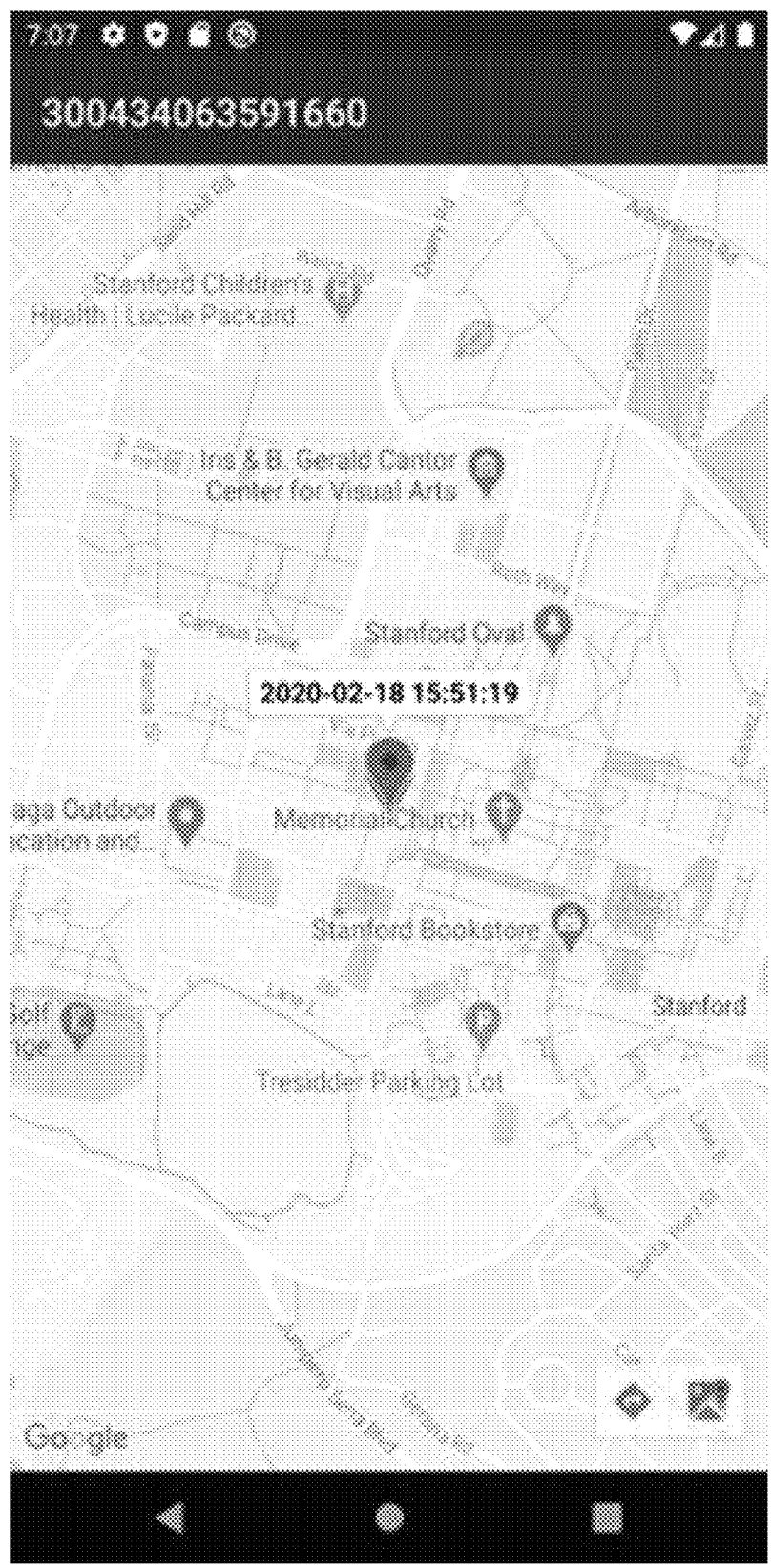
FIG. 19 illustrates an Android application showing a tracking tag's location calculated by a server in accordance with an embodiment of the invention.

In accordance with an embodiment of the invention, server-side firmware can be built with a server capable of receiving Iridium messages containing GPS/GNSS observables and processing the data. The server-side firmware can achieve this by utilizing initial estimates of time and position derived from message information and/or other sources, by utilizing GNSS satellite information derived from a local receiver and/or other available sources. In accordance with an embodiment of the invention, an application (app) can converge on a position and can present the position information to an end-user, as shown in FIG. 19. While specific server-side firmware and end-user app are described above as regards to FIG. 19, any of a variety of server-side firmware and end-user app can be utilized in accordance with various embodiments of the invention. Applications are disclosed further below.

Applications

In many embodiments, systems and methods for GPS/GNSS based real time global asset tracking can be utilized in marine environments due to its ability to provide precise positions in near real time. In various embodiments, systems and methods for GPS/GNSS based real time global asset tracking can be used in marine animal tracking and potentially anti-poaching applications. The tracking tag can activate if a tagged marine animal is caught and pulled out of the water. Moreover, the tag technology can quickly determine and transmit information on its location before the tag can be disabled. In several embodiments, systems and methods for GPS/GNSS based real time global asset tracking can be employed for use in anti-poaching activities on land, where the tacking tag's sensor may trigger activation based on a tagged animal's activity, and/or anxiety based on sensors measuring movement (accelerometer). Accurate position (better than 25 meters) and time can mean that the poacher can be identified readily via satellite imagery or interdicted accurately by law enforcement. Note that the specific number for position accuracy can vary.

In certain embodiments, systems and methods for GPS/GNSS based real time global asset tracking can be utilized in marine asset tracking applications. In these applications, systems and methods for GPS/GNSS based real time global asset tracking can rapidly determine and transmit the location of an asset either on a regular basis or when an extraordinary event occurs. Tracking fishing equipment can be an example of a marine asset tracking application. For example, lobster/crab pots, which are typically fixed at a location, can be unmoored by a storm causing economic loss to the owner and an environmental hazard for wild life. Systems and methods for GPS/GNSS based real time global asset tracking can detect when such events happen, by monitoring the tag's sensors (e.g. pressure and accelerometer), and by regular calculations of positions and by data transmissions when there is rapid movement or surfacing. In certain embodiments, systems and methods for GPS/GNSS based real time global asset tracking can track autonomous underwater vehicles (AUVs) such as a wave glider or sail drone which can have multi-month autonomous missions.

In several embodiments, systems and methods for GPS/GNSS based real time global asset tracking can be utilized in precision marine science applications, where rapid (3 sec) GNSS reception can occur without the need for further onboard processing. Note that the specific time to establish GNSS communication can vary. For example, systems and methods for GPS/GNSS based real time global asset tracking can be utilized during a quick surfacing of a tagged whale, white shark, or other marine animals that are infrequently on the surface of the ocean to locate the whale's position. Since real-time tracking is not critical here, the GNSS information can be stored on the tag for later transmissions. Moreover, since further processing on the tag is not needed, it can provide for a very power efficient operation, thus enabling the reduction of the tag size, thereby reducing the burden on the animal carrying it.

While the above descriptions and associated figures have depicted systems and methods for GPS/GNSS based real time global asset tracking, it should be clear that any of a variety of configurations for systems and methods for GPS/GNSS based real time global asset tracking can be implemented in accordance with embodiments of the invention. More generally, although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What is claimed is:

1. A system for real time global asset tracking, the system comprising:
    a tag having a microcontroller, a memory containing an application, and a plurality of antenna, wherein the application directs the microcontroller to selected one antenna from the plurality of antenna for use in satellite communication;
    a server-side processor;
    a server-side memory comprising a tracking application, where the tracking application directs the processor to:
        determine a time search window based on a message received from the tag;
        perform an initial position search;
        perform calculations for position and time, utilizing the time search window, the initial position search and satellite ephemeris information; and
        display a position information of the tag.

2. The system of claim 1, wherein the tag further comprises a satellite communication sub-system.

3. The system of claim 1, wherein the tag further comprises a navigation receiver.

4. The system of claim 1, wherein the tag further comprises a power management subsystem.

5. The system of claim 1, wherein the tag further comprises a navigation receiver.

6. The system of claim 1, further comprising a plurality of sensors, wherein the plurality of sensors comprises salt water sensors, accelerometers, pressure sensors, and microphones.

7. The system of claim 1, wherein the tag is configured to receive GPS/GNSS data.

* * * * *